US012347412B2

(12) United States Patent
Yoshino et al.

(10) Patent No.: US 12,347,412 B2
(45) Date of Patent: Jul. 1, 2025

(54) ELECTRONIC MUSICAL INSTRUMENT, ACCOMPANIMENT SOUND INSTRUCTION METHOD AND ACCOMPANIMENT SOUND AUTOMATIC GENERATION DEVICE

(71) Applicant: CASIO COMPUTER CO., LTD., Tokyo (JP)

(72) Inventors: Jun Yoshino, Musashimurayama (JP); Toshiyuki Tachibana, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 779 days.

(21) Appl. No.: 17/344,759

(22) Filed: Jun. 10, 2021

(65) Prior Publication Data

US 2021/0407481 A1 Dec. 30, 2021

(30) Foreign Application Priority Data

Jun. 24, 2020 (JP) ................................ 2020-108386

(51) Int. Cl.

*G10H 1/36* (2006.01)
*G10H 1/00* (2006.01)
*G10H 1/34* (2006.01)
*G10H 1/46* (2006.01)

(52) U.S. Cl.

CPC .......... *G10H 1/361* (2013.01); *G10H 1/0008* (2013.01); *G10H 1/344* (2013.01); *G10H 1/46* (2013.01); *G10H 2210/005* (2013.01); *G10H 2220/221* (2013.01)

(58) Field of Classification Search

CPC ...... G10H 1/361; G10H 1/0008; G10H 1/344; G10H 1/46; G10H 1/386; G10H 1/42; G10H 1/26; G10H 1/36; G10H 1/34; G10H 2210/005; G10H 2210/015; G10H 2210/361; G10H 2220/221

See application file for complete search history.

(56) References Cited

U.S. PATENT DOCUMENTS 5,216,188 A 6/1993 Shibukawa
5,486,647 A * 1/1996 Kay ........................ G10H 1/38 84/DIG. 12
5,696,344 A 12/1997 Fujimoto
(Continued)

FOREIGN PATENT DOCUMENTS

JP S5764292 A 4/1982
JP H04242297 A 8/1992
(Continued)

OTHER PUBLICATIONS

Extended European Search Report (EESR) dated Nov. 23, 2021, issued in counterpart European Application No. 21179111.6.

*Primary Examiner* — Dedei K Hammond
*Assistant Examiner* — Philip G Scoles
(74) *Attorney, Agent, or Firm* — Holtz, Holtz & Volek PC

(57) ABSTRACT

The present invention aims to change contents of an automatic accompaniment in accordance with a pitch range of a key that a user plays. The electronic musical instrument includes operated keys and a processor. The processor acquires the number of operated keys for each pitch range in accordance with the operation of the keyboard and instructs to switch an automatic accompaniment pattern accompaniment sounds to be emitted in accordance with the acquired number of operated keys for each pitch range.

20 Claims, 7 Drawing Sheets

(56) References Cited

U.S. PATENT DOCUMENTS

| | | | | |
|---|---|---|---|---|
| 5,850,051 | A | 12/1998 | Machover et al. | |
| 9,728,173 | B2 * | 8/2017 | Watanabe ................ | G10H 1/38 |
| 2013/0239789 | A1 * | 9/2013 | Tabata ..................... | G10H 1/32<br>84/746 |
| 2013/0298750 | A1 | 11/2013 | Kira et al. | |

FOREIGN PATENT DOCUMENTS

| | | | | |
|---|---|---|---|---|
| JP | H06102878 | A | | 4/1994 |
| JP | 2001175263 | A | | 6/2001 |
| JP | 2005099579 | A | * | 4/2005 |

* cited by examiner

FIG. 3B
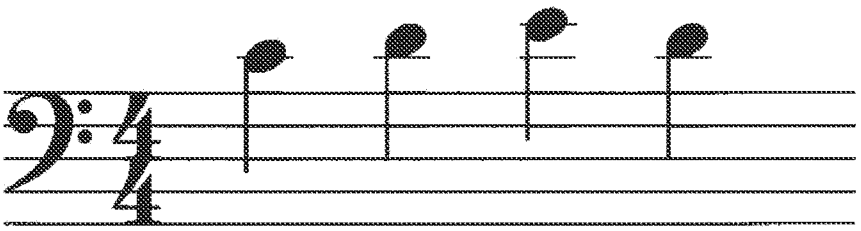
FIG. 3C
| | | | |
|---|---|---|---|
| C | Am7 | Dm7 | G7 |
FIG. 4
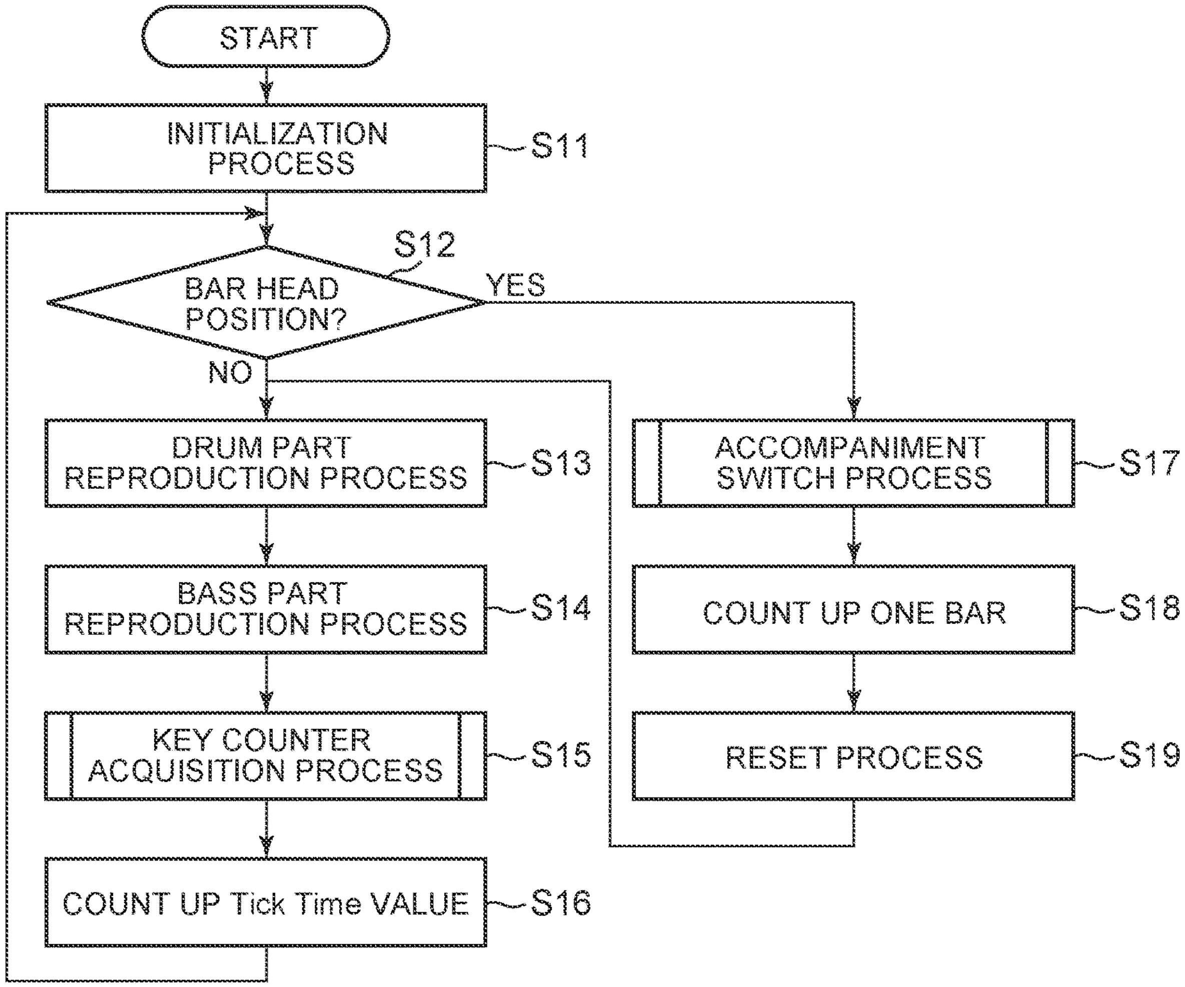

ELECTRONIC MUSICAL INSTRUMENT, ACCOMPANIMENT SOUND INSTRUCTION METHOD AND ACCOMPANIMENT SOUND AUTOMATIC GENERATION DEVICE

BACKGROUND OF THE INVENTION

1. Field of the Invention

The present invention relates to an electronic musical instrument, an accompaniment sound instruction method, and an accompaniment sound automatic generation device which make it possible to instruct to emit accompaniment sounds.

2. Description of the Related Art

In an existing electronic musical instrument, there is known a technology of changing a value of a parameter, while supplying the parameter which is set for at least one of a direction that a tone length changes, a direction that loudness changes, a direction that a tone pitch changes, a width that the tone pitch changes and a note attribute to be used for, for example, an accompaniment pattern and creating the accompaniment pattern such that desirable accompaniment sounds are generated at a desirable point of time on the basis of the parameter (for example, Japanese Patent Application Laid-Open No. 2001-175263).

SUMMARY OF THE INVENTION

However, the accompaniment pattern which is generated by the above-described existing technology is of the type that accompaniment data which is programmed in advance via the parameter is reproduced again and again. Accordingly, in the existing technology, although the accompaniment pattern is changed following a chord to which the parameter is given in accordance with a user's intention, in a case where the instrument is played with the same chord, the same playing which follows a program which is prepared in advance is repeated. As a result, it becomes impossible to realize such an automatic accompaniment that an ad-lib which is performed, for example, in a jazz accompaniment is effectively used and therefore the playing sounds mechanically.

In one example of one aspect of the present invention, an electronic musical instrument includes a key board which is configured by a plurality of playing operators and at least one processor. At least one processor acquires the number of operated playing operators for each pitch range in accordance with an operation of the keyboard and gives instructions for switching an automatic accompaniment pattern of accompaniment sounds to be emitted in accordance with the acquired number of operated playing operators for each pitch range.

According to the present invention, it becomes possible to change contents of the automatic accompaniment in accordance with a pitch range of a sound that the user plays.

BRIEF DESCRIPTION OF THE DRAWINGS

FIG. 3B is an explanatory diagram illustrating one example of an operation in one embodiment of the present invention.

FIG. 3C is an explanatory diagram illustrating one example of an operation in one embodiment of the present invention.

FIG. 4 is a main flowchart illustrating one example of entire processing.

DETAILED DESCRIPTION OF THE INVENTION

Figure 1:
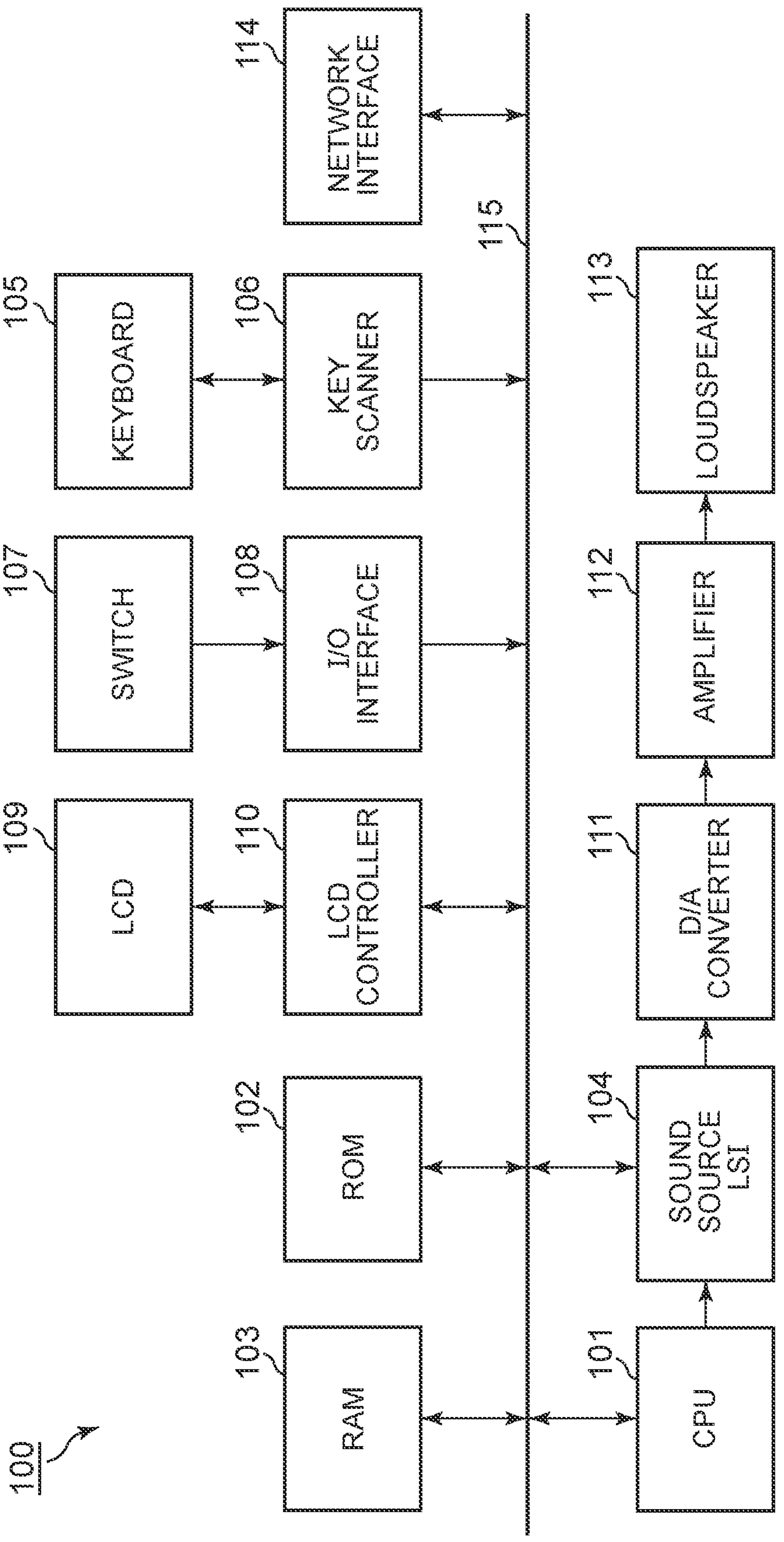
FIG. 1 is a block diagram illustrating one configuration example of system hardware of an electronic musical instrument according to one embodiment of the present invention.

In the following, one embodiment of the present invention will be described in detail with reference to the drawings. FIG. 1 is a diagram illustrating one configuration example of system hardware of an electronic musical instrument 100 according to one embodiment of the present invention.

The electronic musical instrument 100 is, for example, an electronic keyboard instrument and includes a keyboard 105 which is configured by a plurality of keys which functions as a plurality of playing operators, a switch 107 which includes switches which are used for instructing various settings such as turning on/off of a power source of the electronic musical instrument 100, sound volume adjustment, designation of a tone when outputting a musical sound, tempo setting of an automatic accompaniment and so forth and a switch, a bend wheel, a pedal and so forth which are used for adding a playing effect, an LCD (Liquid Crystal Display) 109 which displays various setting information and so forth. In addition, the electronic musical instrument 100 is equipped with a loudspeaker/loudspeakers 103 which emits/emit musical sounds which are generated by playing the musical instrument and is/are installed on a rear-face part(s), a side-face part(s), a back-face part(s) and so forth of a housing.

In addition, in the electronic musical instrument 100, a CPU (Central Processing Unit: processor) 101, a ROM (Read Only Memory) 102, a RAM (Random Access Memory) 103, a sound source LSI (Large-Scale Integrated Circuit) 104, a key scanner 106 to which the keyboard 105 is connected, an I/O interface 108 to which the switch 107 is connected, an LCD controller 110 to which the LCD 109 is connected and a network interface 114 which is configured by an MIDI (Musical Instrument Digital Interface) and so forth and fetches music data over an external network are connected to a system bus 115 respectively. Further, a D/A converter 111, an amplifier 112 and the loudspeaker(s) 113 are sequentially connected to the output side of the sound source LSI 104.

The CPU 101 executes a control program which is stored in the ROM 102 while using the RAM 103 as a work memory and thereby executes an operation of controlling the electronic musical instrument 100 in FIG. 1. In addition, the ROM 102 stores music data which includes, for example, jazz bass line data, in addition to the above-mentioned control program and various kinds of fixed data.

In this case, the CPU 101 fetches playing data in accordance with an operation of the keyboard 105 by a user via the key scanner 106 and the system bus 115, generates note-on data and note-off data which accord with the playing data and outputs the generated note-on data and note-off data to the sound source LSI 104. Thereby, the sound source LSI 104 generates and outputs music sound waveform data which accords with the input note-on data and note-off data or terminates data output. The music sound waveform data which is output from the sound source LSI 104 is converted to analog music sound waveform signals by the D/A converter 111 and then the signals are amplified by the amplifier 112 and are emitted from the loudspeaker(s) 113 as music sounds of music that the user plays.

Keeping pace with an operation of emitting the music sounds of the music that the user plays, the CPU 101 sequentially inputs playing patterns used for an automatic accompaniment to, for example, a piece of jazz music that the user designates from the switch 107 via the I/O interface 108 and the system bus 115 from, for example, the ROM 102 via the system bus 115, sequentially determines note numbers of accompaniment sounds which are instructed on the basis of the playing patterns, sequentially generates the note-on data or the note-off data on the note numbers and outputs the generated note-on or not-off data to the sound source LSI 104 sequentially. Thereby, the sound source LSI 104 generates and outputs accompaniment sound music sound waveform data which corresponds to accompaniment sounds to musical sounds which are played and input or terminates output of the accompaniment sound music sound waveform data. The accompaniment sound music sound waveform data which is output from the sound source LSI 104 is converted to analog music sound waveform signals by the D/A converter 111 and then the signals are amplified by the amplifier 112 and are emitted from the loudspeaker(s) 113 as accompaniment music sounds which automatically accompany the musical sounds of the music that the user plays.

The sound source LSI 104 has an ability to oscillate voice signals up to, for example, 256 simultaneously in order to simultaneously output the music sounds that the user plays and the automatic accompaniment sounds.

The key scanner 106 steadily scans a key pressed/released state of the keyboard 105, and interrupts the CPU 101 and informs the CPU 101 of a change in state of the keyboard 105.

The I/O interface 108 steadily scans an operation state of the switch 107, and interrupts the CPU 101 and informs the CPU 101 of a change in state of the switch 107.

The LCD controller 110 is an IC (Integrated Circuit) which controls a display state of the LCD 109.

The network interface 114 is connected to, for example, the Internet, a LAN (Local Area Network) and so forth and thereby it becomes possible to acquire the control programs, the various kinds of music data, automatic playing data and so forth which are used in the electronic musical instrument 100 according to one embodiment and to store the acquired data into the RAM 103 and so forth.

An operational outline of the electronic musical instrument 100 illustrated in FIG. 1 will be described following the explanatory diagrams of the operations in FIG. 2A to FIG. 2D and FIG. 3A to FIG. 3C. In one embodiment, it becomes possible to automatically generate and emit accompaniment sounds to, for example, jazz along with playing that the user performs with the keyboard 105.

The CPU 101 acquires the number of key pressing operations by the user. In this case, the CPU 101 acquires chord data per bar or per beat in a bar from, for example, the ROM 102, executes a drum part reproduction process, a bass part reproduction process, a key counter acquisition process and an accompaniment switch process on the basis of the chord data, generates a bass line in accordance with the acquired chord data and the executed processes and instructs the sound source LSI 104 to emit sounds which accord with the generated bass line.

The drum part reproduction process is a process that a parameter which relates to drum part reproduction which becomes definite in the accompaniment switch process is input and reproduction of the drum part is executed conforming to the input parameter. As the parameter, for example, a snare drum sound generation probability is input randomly.

The bass part reproduction process is a process that a parameter which relates to bass part reproduction which becomes definite in the accompaniment switch process is input and reproduction of the bass part is executed conforming to the input parameter.

The key counter acquisition process is a process of counting a note number of each key for each pitch range which is pressed by the user by each key counter which corresponds to each pitch range. The CPU 101 divides a pitch range that a player (in the following, will be called "the user") plays into, for example, four pitch ranges and counts the note number which corresponds to each divided pitch range. Thereby, it becomes possible to change the accompaniment in correspondence with playing of each key for each. The number of the pitch ranges to be divided is not limited to four and the pitch range may be divided into three or five pitch ranges.

The accompaniment switch process is a process of indicating a pattern and so forth of the bass part depending on a value of the key counter which counts the note number of each key for each pitch range which is pressed by the user. In the accompaniment switch process, the CPU 101 determines any one of the plurality of patterns in accordance with the acquired number of operations of pressing each key for each pitch range. Then, the CPU 101 instructs to emit the accompaniment sound which accords with the determined pattern. Thereby, it becomes possible to change the contents of the automatic accompaniment in accordance with the pitch range that the user plays.

The accompaniment switch process may be also a system of switching the accompaniment by changing sound emission forms respectively on the basis of accompaniment data on one pattern.

For example, in a case where only a lower pitch range (a first pitch range) key (a first key) is pressed by the user and only the note number of the lower pitch range (first pitch range) key (the first key) is counted by a lower pitch range key counter in a previous bar, the CPU 101 determines this case as a first pattern. In a case where the first pattern is determined, the CPU 101 decides that the user is playing only the bass part and instructs to mute sound emission of the bass part, that is, instructs to switch an automatic accompaniment pattern of accompaniment sounds to be emitted.

In addition, in a case where only a mid-low pitch range (a second pitch range) key is pressed by the user and only the note number of the mid-low pitch range key is counted by a mid-low (pitch range key counter in the previous bar, the CPU 101 determines this case as a second pattern. In a case where the second pattern is determined, the CPU 101 decides that the user is playing only a chord part and instructs to raise a musical interval of the bass part and to emit sounds in an accompaniment pattern that a bass solo is highlighted, that is, instructs to switch the automatic accompaniment pattern of the accompaniment sounds to be emitted.

In addition, in a case where only a mid-high pitch range key or only a higher pitch range key is pressed by the user in the previous bar and neither the first pattern nor the second pattern is determined and in a case where the note number of the mid-high pitch range key is counted by a mid-high pitch range key counter, the CPU 101 instructs to increase snare drum sound reproduction frequency of the drum part and to increase the velocity of a ride (a ride cymbal) in the drum part, that is, instructs to switch the automatic accompaniment pattern of the accompaniment sounds to be emitted. Thereby, it becomes possible to produce the drum part showily in correspondence with the contents of playing by the user.

Figure 2A:
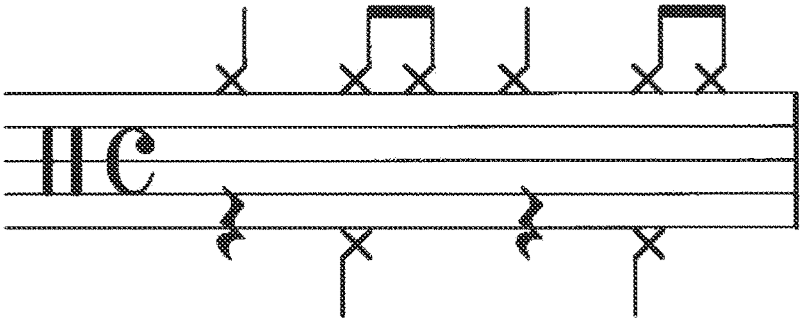
FIG. 2A is an explanatory diagram illustrating one example of an operation in one embodiment of the present invention.

The bass part of such a basic pattern as that indicated in, for example, a musical score 1 in FIG. 2A is stored in the ROM 102 in FIG. 1. The musical score 1 indicates a basic form of "Swing". For example, it becomes possible for the CPU 101 to construct variations of playing phrases by adding a snare drum part, a kick drum part and so forth to this basic pattern. In the snare drum part, for example, in a case where a parameter that a snare drum sound generation probability is 100% is input, it indicates that all back-foiled snare drums are played as indicated in a musical score 2 in FIG. 2B. The CPU 101 changes the number of snare drums to be played, for example, by randomly changing the snare drum sound generation probability. Incidentally, the basic pattern is not limited to the pattern in FIG. 2A and may be changed on the basis of the value and so forth of each key counter.

Figure 2B:
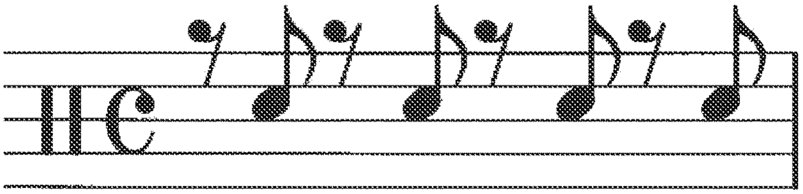
FIG. 2B is an explanatory diagram illustrating one example of an operation in one embodiment of the present invention.
Figure 2C:
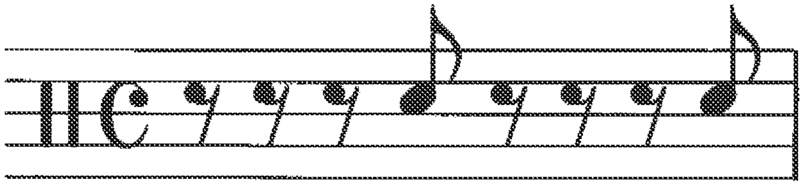
FIG. 2C is an explanatory diagram illustrating one example of an operation in one embodiment of the present invention.
Figure 2D:
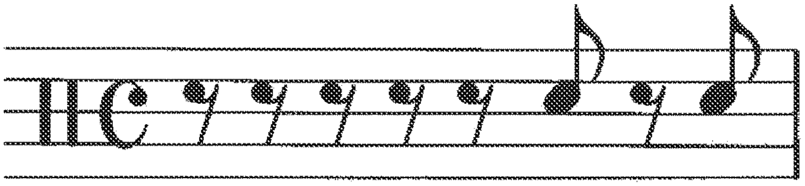
FIG. 2D is an explanatory diagram illustrating one example of an operation in one embodiment of the present invention.

Processes of emitting and muting each snare drum sound in the music score 2 illustrated in FIG. 2B are executed, for example, by randomly changing the snare drum sound generation probability. For example, in a case where a parameter that the snare drum sound generation probability is 50% is input in the snare drum part, it means that the snare drum is played with the snare drum sound generation probability of 50% as indicated in a musical score 3 in FIG. 2C or a musical score 4 in FIG. 2D. Incidentally, the numerical value 50% indicates generation probability of each note and therefore is not limited to the one that the snare drum sound is generated two times typically in one bar.

Although, in one embodiment, one example of the snare drum sound generation probability is described as the parameter relating to drum sound reproduction, the present invention is not limited thereto and kick drum sound reproduction frequency and ride cymbal sound strength (velocity) may be changed in place of or in addition to the snare drum sound generation probability as parameters relating to the drum sound reproduction. It becomes possible to change the sound strength when the ride cymbal is played, for example, by inputting the velocity value of the ride cymbal sound which is generated in the accompaniment switch process as a parameter. The "snare drum", the "ride cymbal" and so forth in one embodiment of the present invention may be replaced with constitutional elements (for example, a bass drum, a high-hat cymbal and so forth) of an optional drum set.

Figure 3A:
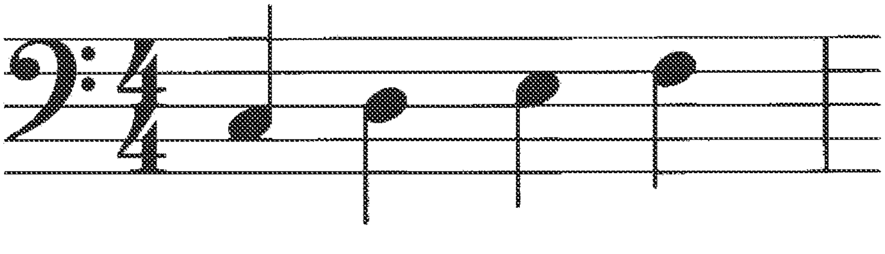
FIG. 3A is an explanatory diagram illustrating one example of an operation in one embodiment of the present invention.

In the following, one example that the CPU 101 sets a pitch range which does not exceed G3 will be described as basic setting in a generation phase of the bass part. A musical score 5 in FIG. 3A is one example of the musical score of a pattern A which indicates the bass line which is generated when the chord is C and is generated in the pitch range which does not exceed G3. A musical score 6 in FIG. 3B is one example of a musical score of a pattern B which indicates a bass line which is played in a case where such a parameter that the pattern B is played is input in the accompaniment switch process. In the present invention, the pattern A may be replaced with a general (or not solo playing) bass line, a bass line which does not exceed a predetermined note number (for example, G3) and so forth. In addition, in the present invention, the pattern B may be replaced with a solo-oriented bass line, a bass line which exceeds a predetermined note number (for example, G3) and so forth.

For example, in a case where the mid-low pitch range counter indicates 1 or more in the accompaniment switch process, the CPU 101 sets a flag of the pattern B. In a case where the flag of the pattern B is set in the accompaniment switch process, the CPU 101 instructs to emit accompaniment sounds by a bass playing pattern, that is, the pattern B that the bass is played in the pitch range which exceeds G3 and thereby the bass part is played.

The musical score 5 in FIG. 3A and the musical score 6 in FIG. 3B are examples of the patterns which indicate the base lines which are generated in a case where the chord is C. However, the chord is not limited to C and, for example, in a case where such a chord progression as that in FIG. 3C occurs, the bass part is played along each chord.

In one embodiment, the bass part and the drum part are played while being changed in accordance with the number of operated keys which are pressed by the user per pitch range as described above. Thereby, it becomes possible to change the contents of the accompaniment and it becomes possible to enjoy the accompaniments of the bass part and the drum part that the user does not get tired no matter how many times the user listens.

FIG. 4 is a main flowchart illustrating one example of general processing for explaining a method of executing control processes that the CPU 101 reads out from the ROM 102 to the RAM 103 of the electronic musical instrument 100 according to one embodiment in FIG. 1. For example, the user pushes a power source switch which is included in the switch 107 and thereby execution of the processing in this main flowchart is started.

First, the CPU 101 executes an initialization process (step S11 in FIG. 4). In the initialization process, first, the CPU 101 resets Tick Time which controls the progress of the automatic accompaniment, the number of bars, the number of beats and the key counters. In one embodiment, the automatic accompaniment progresses with a value of a Tick Time variable (in the following, the variable value will be also called "Tick Time" which is the same as the variable name) which is stored in the RAM 103 in FIG. 1 being set as a unit. A value of a Time Division constant (in the following, the constant value will be also called "Time Division" which is the same as the constant name) is set in advance in the ROM 102 in FIG. 1. The Time Division constant indicates a resolution of one beat (for example, a quarter note) and in a case where this value is, for example, 96, one beat has a time length of 96×Tick Time. Here, the actual number of seconds of 1 Tick Time varies depending on a tempo which is designated to music data. Here, in a case where a value which is set for a Tempo variable on the RAM 103 is expressed as Tempo [beat/minute] in accordance with setting by the user, the number of seconds of Tick Time=Tick Time Sec [second] is calculated by the following formula (1).

$$\text{Tick Time Sec [second]}=60/\text{Tempo}/\text{Time Division} \quad (1)$$

Then, in the initialization process in step S11 in FIG. 4, the CPU 101 calculates Tick Time Sec (second) by an arithmetic operation process which corresponds to the formula (1), sets a calculated value in a not-illustrated hardware timer in the CPU 101 and resets the Tick Time variable value on the RAM 103 to 0. The hardware timer makes an interruption occur every time the set Tick Time Sec [second] passes. Incidentally, as a value which is set to the Tempo variable, a predetermined value which is read out from within constants in the ROM 102 in FIG. 1, for example, 60 [beat/second] may be initialized in an initial state. As an alternative, the Tempo variable may be stored into a non-volatile memory and a value of Tempo which is obtained at the end of the previous operation may be maintained as it is when the power source of the electronic musical instrument 100 is turned on again.

In addition, in the initialization process in step S11 in FIG. 4, the CPU 101 resets the value of the variable which indicates the number of bars on the RAM 103 to a value 1 which indicates a first bar and resets the value of the variable which indicates the number of beats on the RAM 103 to a value 1 which indicates a first beat.

Further, in the initialization process in step S11 in FIG. 4, the CPU 101 acquires the playing pattern which is illustrated in FIG. 2A and becomes a basis for the automatic accompaniment from the ROM 102 and stores the acquired accompaniment pattern into the RAM 103.

Then, the CPU 101 repetitively executes a series of processes in step S12 to step S16 in FIG. 4 per Tick Time. A drum part reproduction process (step S13), a bass part reproduction process (step S14) and a key counter acquisition process (step S15) which will be described later are executed by putting Tick Time forward.

Then, at a head position of a bar concerned, additional process such as an accompaniment switch process (step S17), a bar count-up process (step S18) and a resetting process (step S19) which will be described later are executed. The CPU 101 performs switching of the automatic accompaniment pattern in the accompaniment switch process and executes the bar count-up process and various resetting processes in accordance with key counter information which is acquired by execution of the key counter acquisition process.

For example, in a case where one beat is set as 96 Tick Time Sec, one bar is calculated by the following formula (2) in a case of four-four time.

$$\text{One bar}=96*4\cdot\text{Tick} \quad (2)$$

In a series of these processes, first, the CPU 101 decides whether a part concerned is the head position of the bar (step S12). In a case where NO is decided in step S12, that is, the part concerned is not the head position of the bar, the CPU 101 executes the drum part reproduction process in step S13.

In a case where execution of the drum part reproduction process in step S13 is terminated, then, the CPU 101 executes the bass part reproduction process (step S14).

Figure 5:
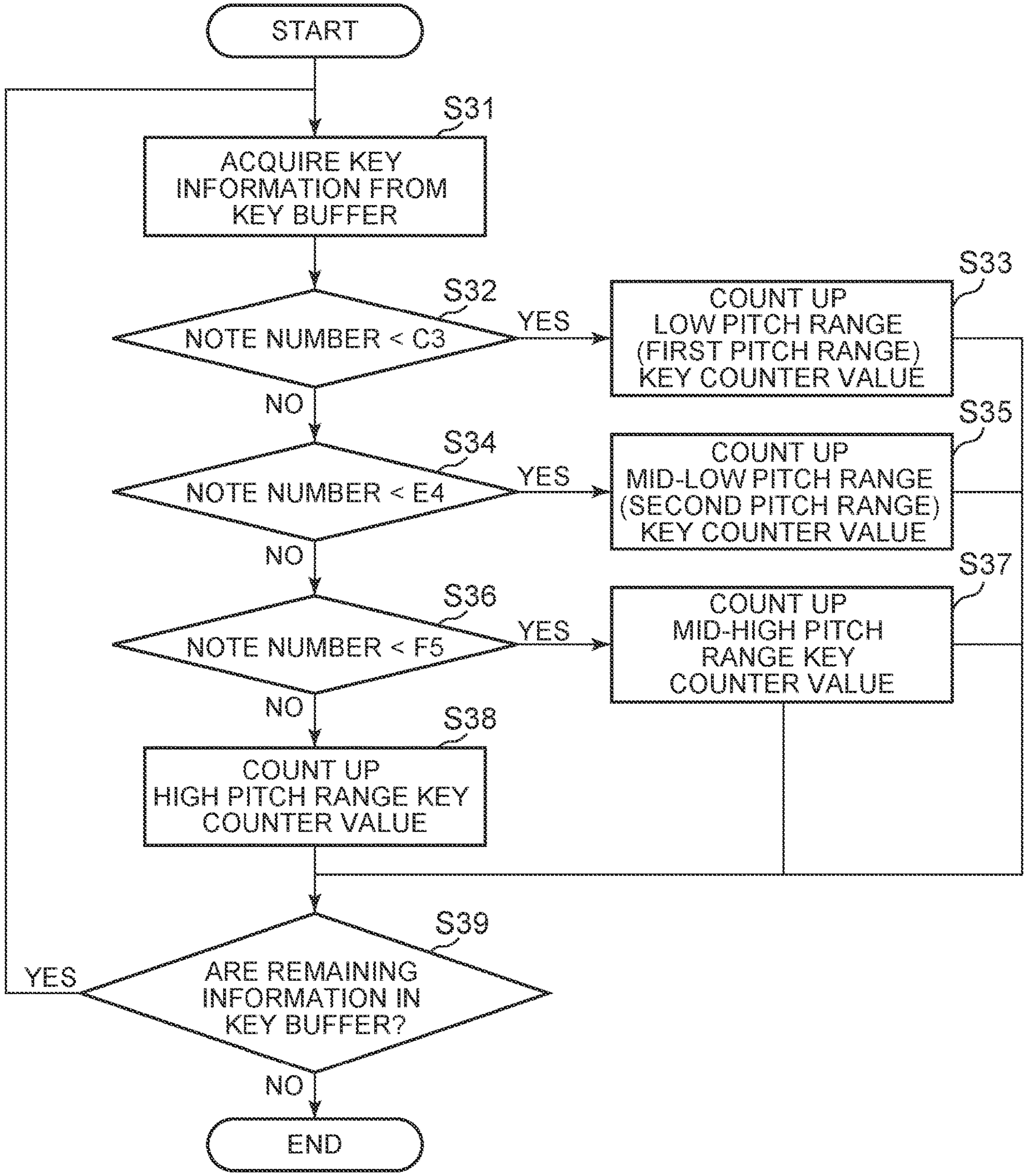
FIG. 5 is a flowchart illustrating one example of a key counter acquisition process.

Then, the CPU 101 executes the key counter acquisition process (step S15). FIG. 5 is a flowchart illustrating one example of the key counter acquisition process which is executed in step S15 in FIG. 4. The CPU 101 fetches a state of playing the keyboard 105 in FIG. 1 in a task other than the key counter acquisition process, and, in a case where key pressing by the user occurs on the keyboard 105, stores note-on data (keyboard key pressing information) which includes a note number value and a velocity value which correspond to the pressed key into a key buffer. The key buffer is stored in, for example, the RAM 103 in FIG. 1. In the key counter acquisition process, the CPU 101 acquires the information which is stored in the key buffer sound by sound and executes a process of acquiring the number of operated keys per pitch range.

First, the CPU 101 acquires key information on one sound from the key buffer (step S31). Then, the CPU 101 decides whether the note number of the key concerned is smaller than C3 (step S32).

In a case where YES is decided in step S32, that is, in a case where the note number is smaller than C3, the CPU 101 counts up the value of the lower pitch range (the first pitch range) key counter (the number of first keys) (step S33). In a case where the note number is smaller than C3, the CPU 101 operates such that the user himself/herself becomes able to recognize that the user is playing a part which corresponds to the lower pitch range, that is, a bass pitch range. After termination of execution of this process, the process proceeds to step S39.

In a case where NO is decided in step S32, that is, in a case where the note number is larger than C3, the CPU 101 decides whether the note number is smaller than E4 (step S34).

In a case where YES is decided in step S34, that is, in a case where the note number is smaller than E4, the CPU 101 counts up the value of the mid-low pitch range (the second pitch range) key counter (step S35). In a case where the note number is larger than C3 and is smaller than E4, the CPU 101 operates such that the user himself/herself becomes able to recognize that the user is playing a part which corresponds to the mid-low pitch range (the second pitch range), that is, a chord pitch range. After termination of execution of this process, the process proceeds to step S39.

In a case where NO is decided in step S34, that is, in a case where the note number is larger than E4, the CPU 101 decides whether the note number is smaller than F5 (step S36).

In a case where YES is decided in step S36, that is, in a case where the note number is smaller than F5, the CPU 101 counts up the value of the mid-high pitch range key counter (step S37). In a case where the note number is larger than E4 and is smaller than F5, the CPU 101 operates such that the user himself/herself becomes able to recognize that the user is playing a part which corresponds to the mid-high pitch range, that is, a melody pitch range. After termination of execution of this process, the process proceeds to step S39.

In a case where NO is decided in step S36, that is, in a case where the note number is larger than F5, the CPU 101 counts up the value of the higher pitch range key counter (step S38). In a case where the note number is larger than F5, the CPU 101 operates such that the user himself/herself becomes able to recognize that the user is playing a part which corresponds to the higher pitch range. After termination of execution of this process, the process proceeds to step S39.

The CPU 101 decides whether there is remaining key information in the key buffer (step S39). In a case where YES is decided in step S39, that is, in a case where note information on the key which is pressed in one bar remains in the key buffer, the CPU 101 repetitively executes the processes in step S31 to step S39 on all pieces of the note information.

In a case where NO is decided in step S39, that is, in a case where the CPU 101 executes the processes in step S31 to step S39 on all pieces of the note information which are stored in the key buffer, execution of the key counter acquisition process in FIG. 5 is terminated and the process proceeds to step S16 in FIG. 4.

Incidentally, in the key counter acquisition process in one embodiment, the CPU 101 divides the pitch range of the musical instrument that the user plays into four pitch ranges and counts the note number which corresponds to each pitch range. However, the present invention is not limited thereto. For example, in a region that respective pitch ranges mutually overlap, the note number which corresponds to each pitch range may be counted. In addition, C3, E4, F5 and so forth in the above examples may be optional note numbers and may be replaced with a first note number, a second note number and a third note number respectively.

In step S16 in FIG. 4, the CPU 101 counts up the Tick Time value which is the variable on the RAM 103.

Figure 6:
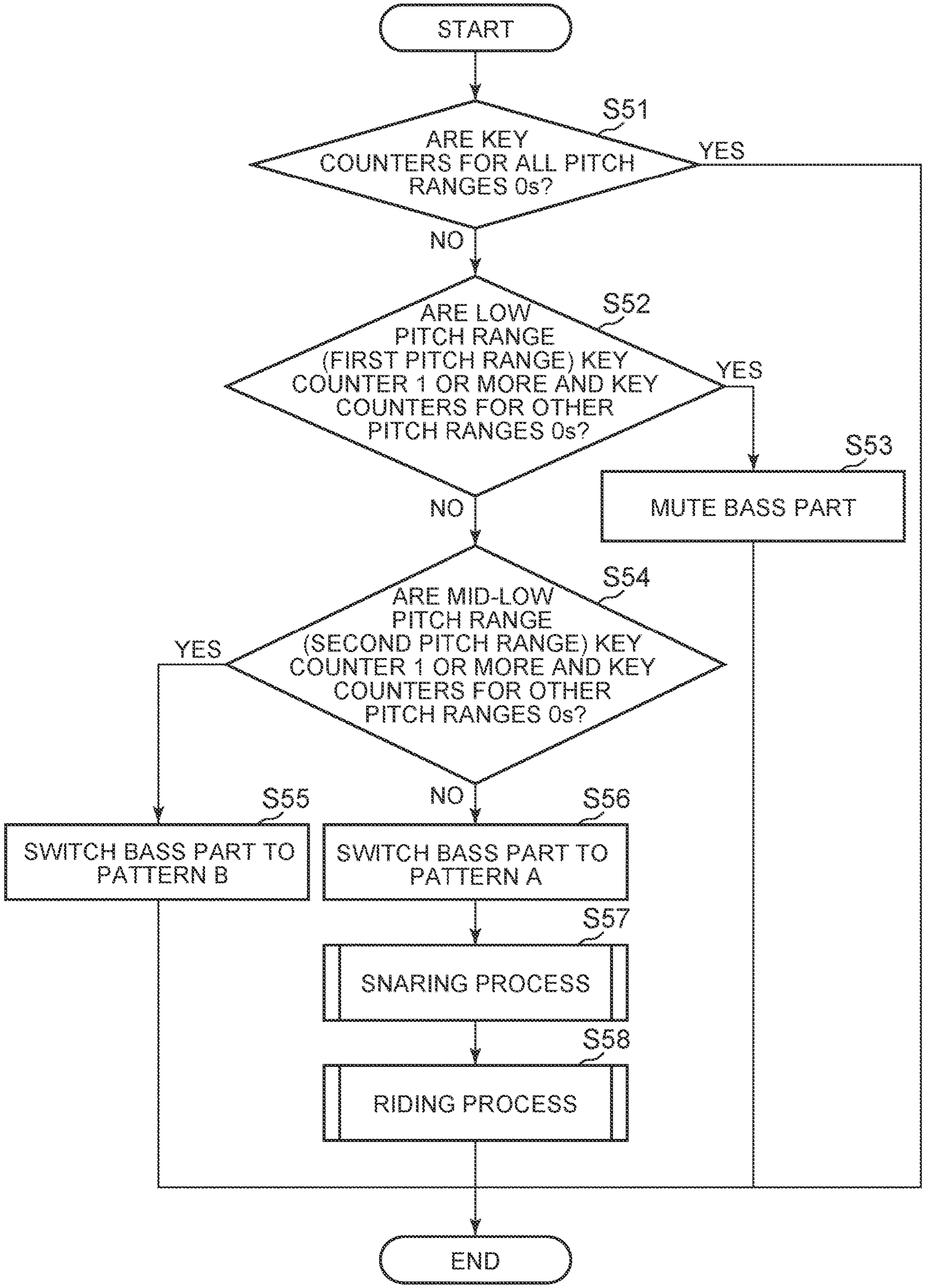
FIG. 6 is a flowchart illustrating one example of an accompaniment switch process.

Returning to the process in step S12, in a case where YES is decided in step S12, that is, in a case where the part concerned is the head position of the bar, the CPU 101 executes the accompaniment switch process in step S17. FIG. 6 is a flowchart illustrating one example of the accompaniment switch process which is executed in step S17 in FIG. 4.

First, the CPU 101 decides whether the key counters for all pitch ranges indicate 0s, that is, whether the lower pitch range (first pitch range) key counter, the mid-low pitch range key counter, the mid-high pitch range (second pitch range) key counter and the higher pitch range key counter indicate 0s (step S51). That is, in a case where the CPU 101 decides that key pressing by the user is not performed in one bar, the CPU 101 terminates execution of the process with no execution of switching of the accompaniment. In a case where YES is decided in step S51, that is, in a case where the key counters for all the pitch ranges indicate 0s, execution of the accompaniment switch process in FIG. 6 is terminated and the process proceeds to step S18 in FIG. 4.

In a case where NO is decided in step S51, that is, in a case where a key counter for any one of pitch ranges in the lower pitch range (first pitch range) key counter, the mid-low pitch range (second pitch range) key counter, the mid-high pitch range key counter and the higher pitch range key counter indicates a value which is more than 1, the CPU 101 decides whether the lower pitch range (first pitch range) key counter indicates the value which is more than 1 and the key counters for other pitch ranges indicate 0s (step S52).

In a case where YES is decided in step S52, that is, in a case where the lower pitch range (first pitch range) key counter indicates the value which is more than 1 and the key counters for other pitch ranges indicate 0s, the CPU 101 instructs to mute the bass part (step S53). That is, in a case where the CPU 101 decides that only key pressing in the lower pitch range (first pitch range) is performed by the user and key pressing in pitch ranges other than the lower pitch range (first pitch range) is not performed, the CPU 101 determines this case as the first pattern. In a case where the first pattern is determined, the CPU 101 decides that the user himself/herself is in a state of playing bass solo, instructs to mute the bass part in the bass reproduction process and thereby switches the automatic accompaniment pattern of the accompaniment sounds to be emitted. Thereby, it becomes possible to change the contents of the automatic accompaniment in accordance with the pitch range that the user plays by combing drum playing by the drum part reproduction process with bass playing by the user. In a case where this process is executed, execution of the accompaniment switch process in FIG. 6 is terminated and the process proceeds to step S18 in FIG. 4.

In a case where NO is decided in step S52, the CPU 101 decides whether the mid-low pitch range (second pitch range) key counter indicates a value which is more than 1 and the key counters for other pitch ranges indicate 0s (step S54).

In a case where YES is decided in step S52, that is, in a case where the mid-low pitch range (second pitch range) key counter indicates the value which is more than 1 and the key counters for other pitch ranges indicate 0s, the CPU 101 instructs to switch the bass part to the pattern B (step S55). That is, in a case where the CPU 101 decides that only the key for the mid-low pitch range (the second pitch range) is pressed by the user and keys for pitch ranges other than the mid-low pitch range (second pitch range) are not pressed by the user, the CPU 101 determines this case as the second pattern. In a case where the second pattern is determined, the CPU 101 decides that the user himself/herself is in a state of playing only the chord and not playing a melody part, instructs to switch the bass part of the bass reproduction process to the pattern B and thereby switches the automatic accompaniment pattern of the accompaniment sounds to be emitted. Thereby, it becomes possible to combine chord playing by the user with the automatic accompaniment in a state of highlighting the bass part of the automatic accompaniment. In a case where this process is executed, execution of the accompaniment switch process in FIG. 6 is terminated and the process proceeds to step S18 in FIG. 4.

In a case where NO is decided in step S54, that is, in a case where the mid-high pitch range key counter or the higher pitch range key counter indicates the value which is more than 1, the CPU 101 switches the bass part to the pattern A (step S56). That is, the CPU 101 decides that more than the predetermined number of mid-high pitch range or high pitch range key pressing operations is performed by the user, and in a case where neither the first pattern nor the second pattern is decided, determines this case as a third pattern. In a case where the third pattern is determined, the CPU 101 returns the bass part in the bass reproduction process to the pattern A which accords with the determined third pattern. That is, the CPU 101 switches the automatic accompaniment pattern of the accompaniment sounds to be emitted by instructing to switch the pattern to the pattern A.

Figure 7:
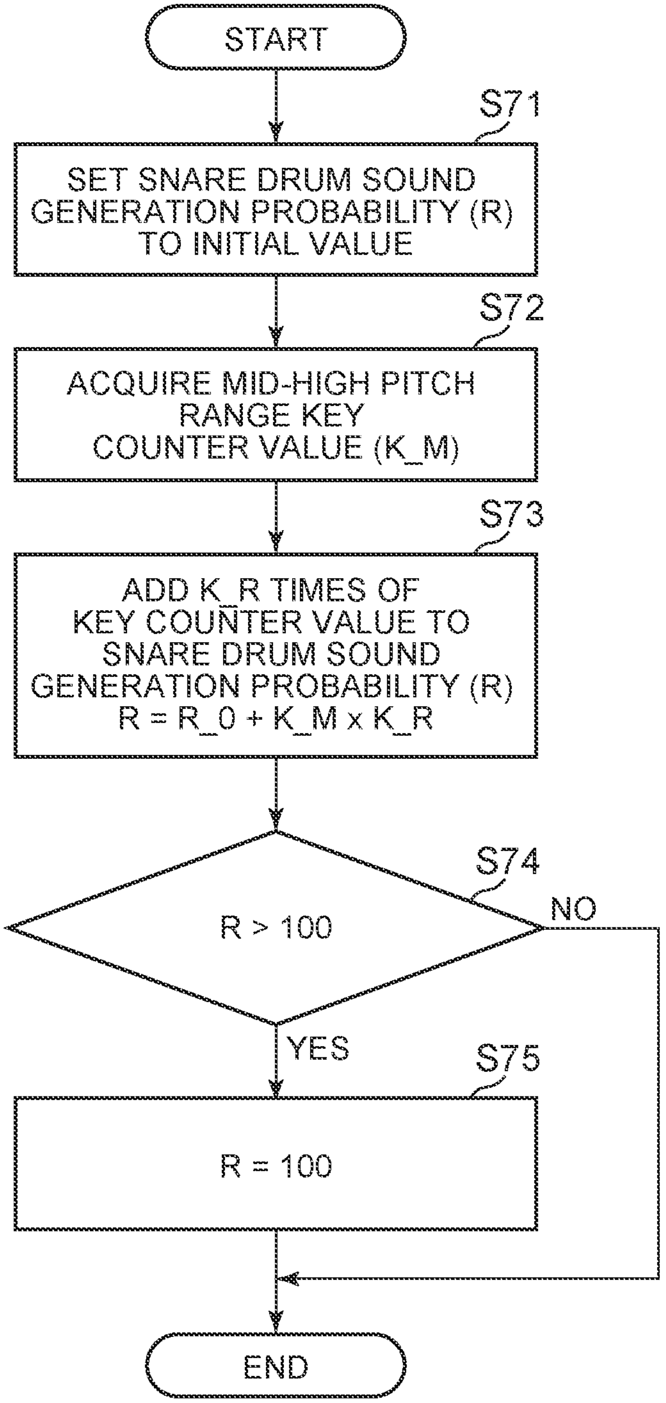
FIG. 7 is a flowchart illustrating one example of a snaring process.

Then, the CPU 101 executes a snaring process of determining a snare drum sound generation probability (reproduction frequency) in the drum part reproduction process in accordance with the number of operated keys in the mid-high pitch range (step S57). In this process, the CPU 101 executes a process of increasing the snare drum sound generation probability depending on the number of counts of the mid-high pitch range key counter. FIG. 7 is a flowchart illustrating one example of the snaring process to be executed in step S57 in FIG. 6.

First, the CPU 101 sets the snare drum sound generation probability (R) to an initial value (step S71). Then, the CPU 101 acquires a value (K_M) of the mid-high pitch range key counter (step S72).

The CPU 101 adds K_R times of the acquired value (K_M) of the mid-high pitch range key counter to the snare drum sound generation probability (R) (step S73). An optional value such as, for example, 5, 10 and so forth is input as K_R. The snare drum sound generation probability (R) is determined by executing an arithmetic operation process of the following formula (3).

$$R=R\_0+K\_M\times K\_R \quad (3)$$

in which R_0 indicates the initial value of the snare drum sound generation probability (R). It is possible to input an optional value which is set in advance as the initial value R_0.

The CPU 101 decides whether the snare drum sound generation probability is more than 100% (step S74). In a case where NO is decided in step S74, that is, in a case where the snare drum sound generation probability is less than 100%, the CPU 101 determines to increase the snare drum sound generation probability in the drum part reproduction process on the basis of the calculated snare drum sound generation probability (R).

In a case where YES is decided in step S74, that is, in a case where the snare drum sound generation probability is more than 100%, the CPU 101 sets the snare drum sound generation probability (R) to 100% (step S74) and determines to increase the snare drum sound generation probability in the drum part reproduction process with the probability of 100%.

That is, in the snaring process, for example, in a case where the number of pressed keys in the mid-high pitch range is 0, the CPU 101 sets the reproduction frequency to 0% (that is, R=0) and thereby it becomes possible to change the snare drum sound generation probability with the reproduction frequency of the number of pressed keys in the mid-high pitch range key pressing operations×10%. Then, in a case where the snare drum sound generation probability exceeds 100%, it becomes possible to restrict such that the snare drum sound generation probability becomes less than 100%. As described above, it becomes possible to play the drum part aggressively by increasing the snare drum sound generation probability by the snaring process and thereby increasing the snare drum sound reproduction frequency in accordance with the number of notes of the melody part that the user plays and therefore it becomes possible to change the contents of the automatic accompaniment following playing by the user. At completion of execution of this process, the process proceeds to step S58 in FIG. 6.

Figure 8:
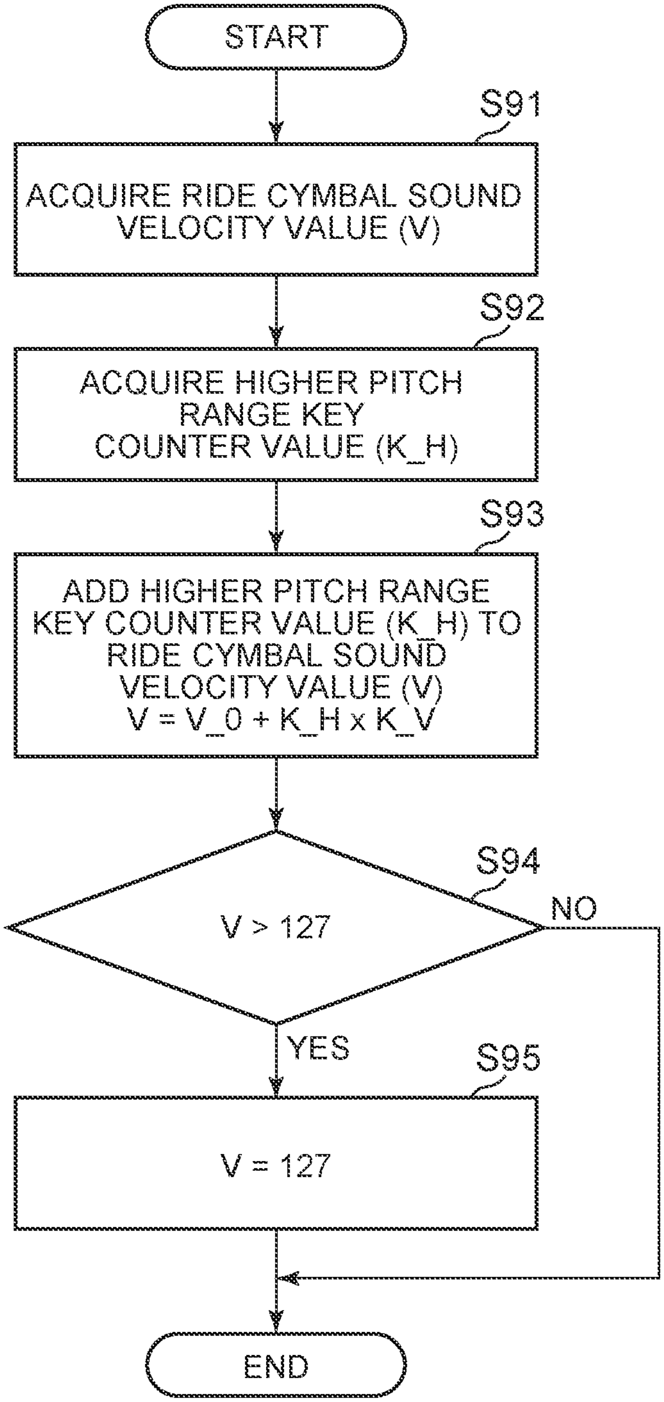
FIG. 8 is a flowchart illustrating one example of a riding process.

In step S58 in FIG. 6, the CPU 101 executes a riding process of determining the velocity of the ride cymbal sound in the ride part depending on the count number of the higher pitch range key counter (step S58). In the riding process, the CPU 101 increases the velocity of the ride cymbal sound in the drum part reproduction process depending on the number of pressed keys in the higher pitch range. FIG. 8 is a flowchart illustrating one example of the riding process which is executed in step S58 in FIG. 6.

First, the CPU 101 acquires a velocity value (V) of the ride cymbal sound (step S91). Then, the CPU 101 acquires a value (K_H) of the higher pitch range key counter (step S92).

The CPU 101 adds the acquired value (K_H) of the higher pitch range key counter to the velocity value (V) of the ride cymbal sound (step S93). An optional value such as, for example, 5 and so forth is input as K_V. The ride cymbal sound velocity value (V) is determined by executing an arithmetic operation process of the following formula (4).

$$V=V\_0+K\_H\times K\_V \quad (4)$$

in which V_0 indicates an initial value of a velocity value generation probability (R) of the ride cymbal sound. As the initial value V_0, it is possible to input a value which is acquired in step S91.

The CPU 101 decides whether the ride cymbal sound velocity value (V) is more than 127 (step S94). In a case where NO is decided in step S94, that is, in a case where the ride cymbal sound velocity value (V) is less than 127, the CPU 101 reproduces the ride cymbal sound in the drum part reproduction process on the basis of the determined ride cymbal sound velocity value (V).

In a case where YES is decided in step S94, that is, in a case where the ride cymbal sound velocity value (V) is more than 127, the CPU 101 decides to set the ride cymbal sound velocity value (V) to 127 (step S95) and reproduces the ride cymbal sound with the velocity value 127 in the drum part reproduction process.

That is, in the riding process, for example, in a case where the number of pressed keys in the higher pitch range is 0, it becomes possible for the CPU 101 to reproduce the ride cymbal sound with the velocity value 50 (V=50) and to change the ride cymbal sound with the velocity value of the number of pressed keys in the higher pitch range×5+50. Then, in a case where the velocity value exceeds 127, it becomes possible for the CPU 101 to restrict such that the velocity value is reduced to 127. As described above, it becomes possible to warm up playing of the drum part by increasing the ride cymbal sound velocity value and thereby increasing the ride cymbal sound reproduction frequency in accordance with the number of notes of the melody part that the user plays by executing the riding process and therefore it becomes possible to change the contents of the automatic accompaniment following the playing by the user. After termination of execution of the riding process, the process proceeds to step S18 in FIG. 4.

In the above accompaniment switch process, it becomes possible for the CPU 101 to set up the value of the key counter which corresponds to the pitch range of the key which is pressed by the user as materials of the change in the contents of the accompaniment. Thereby, it becomes possible to emit accompaniment sounds which are close to sounds that the user imagines.

In step S52 and step S54 in the accompaniment switch process in FIG. 6, the CPU 101 makes decision on condition that the key counters for other pitch ranges indicate 0s. However, the present invention is not limited thereto.

For example, in step S52 in FIG. 6, the CPU 101 may decide whether the value of the lower pitch range key counter is larger than the values of the key counters for pitch ranges other than the lower pitch range (for example, the mid-low pitch range key counter, the mid-high pitch range key counter and the higher pitch range key counter) by a difference X. It is possible to input an optional value ranging from 1 to 10 and so forth as the difference X. In a case where the value of the lower pitch range key counter is larger than the values of the key counters for the pitch ranges other than the low pitch range by the difference X, YES is decided in step S52. In a case where the value of the lower pitch range key counter is smaller than the values of the key counters for the pitch ranges other than the lower pitch range (the first pitch range), NO is decided in step S52.

In addition, for example, in step S54 in FIG. 6, the CPU 101 may decide whether the value of the mid-low pitch range key counter is larger than the values of the key counters for the pitch ranges other than the mid-low pitch range (the second pitch range) (for example, the lower pitch range key counter, the mid-high pitch range key counter and the higher pitch range key counter) by a difference Y. It is possible to input an optional value ranging from 1 to 10 and so forth as the difference Y. In a case where the value of the mid-low pitch range key counter is larger than the values of the key counters for the pitch ranges other than the mid-low pitch range (the second pitch range) by the difference Y, YES is decided in step S54. In a case where the value of the mid-low pitch range key counter is smaller than the values of the key counters for the pitch ranges other than the mid-low pitch range (the second pitch range), NO is decided in step S54.

In addition, although in the key counter acquisition process, the CPU 101 counts the value of each key counter for each pitch range by setting a count scaling factor to 1 (one) time in all the velocities regardless of the strength of each velocity, the present invention is not limited thereto. For example, the CPU 101 may count the value of each key counter on the basis of the strength of the velocity. For example, the CPU 101 may weight the velocity by setting the count scaling factor of a sound which is softly played to a value which is less than one time (for example, 0.5 times and so forth) and setting the count scaling factor of a sound which is loudly played to a value which is more than one time (for example, 1.5 times and so forth). Thereby, it becomes possible to realize music playing which more reflects the intension of the user.

In addition, although in the key counter acquisition process, the CPU 101 counts the value of each key counter for each by setting the count scaling factor to one time in all sound lengths regardless of the length of a sound which is played, the present invention is not limited thereto. For example, the CPU 101 may count the value of each key counter on the basis of the length of the sound which is played. For example, the CPU 101 may weight the length of the sound by setting the count scaling factor of a sound which is played for a short time to a value which is less than one time (for example, 0.5 times and so forth) and setting the count scaling factor of a sound which is played for a long time to a value which is more than one time (for example, 1.5 times and so forth). Thereby, it becomes possible to realize the music playing which more reflects the intension of the user.

In step S18 in FIG. 4, the CPU 101 counts up one bar. Then, the CPU 101 executes a resetting process (step S19). In the resetting process, the CPU 101 resets the Tick Time variable value, adds 1 to the variable value which indicates the number of beats on the RAM 103 and, when the variable value further exceeds 4, the CPU 101 resets the variable value which exceeds 4 to 1 and adds 1 to the variable value which indicates the number of bars on the RAM 103. In addition, the CPU 101 sets the value of each key counter to 0. Then, the CPU 101 returns to the drum part reproduction process in step S13.

It becomes possible to increase the snare drum sound reproduction frequency in accordance with the number of notes of the melody part that the user plays by executing the snaring process. Thereby, it becomes possible to jam out the drum part in accordance with the contents of playing by the user and it becomes possible to change the contents of the automatic accompaniment following the contents of playing by the user.

It becomes possible to increase the velocity of the ride cymbal sound in accordance with the number of pressed keys in the higher pitch range which are pressed by the user in the riding process. Thereby, it becomes possible to liven up playing by the user by playing percussion instruments such as a ride cymbal and others also for the higher along with higher pitch range playing by the user.

In one embodiment, switching of the automatic accompaniment pattern of the accompaniment sounds to be emitted is instructed in accordance with the number of operated playing operators which is acquired for every pitch range in real time in accordance with the operation of the operator of the electronic musical instrument 100. However, the present invention is not limited thereto. For example, in an accompaniment sound automatic generation device which includes a processor and a storage medium, the processor may acquire the number of operated playing operators for each pitch range (or the number of notes (sounds)) which is acquired from playing data which already exists or may instruct to switch the automatic accompaniment pattern of the accompaniment sounds to be emitted in accordance with the acquired number of operations of the playing operator for each pitch range (or the number of the notes (sounds)). The accompaniment sound automatic generation device may be configured by, for example, a personal computer (PC).

Thereby, it becomes possible to instruct emission of the accompaniment sounds which accord with the pattern which is switched on the basis of not only the number of operations of the playing operator which is acquired in real time in accordance with the operation of the operator of the electronic musical instrument 110 but also the number of operations of the playing operator for each pitch range which is acquired from the playing data which already exists. Thereby, it becomes possible to enjoy the accompaniment sounds with no selection of the time and the place and to increase versatility.

As another point to be noted, the present invention is not limited to the above-described embodiment and it is possible to modify the present invention in a variety of ways within a range not deviating from the gist of the present invention in an implementation phase. In addition, functions which are executed in the above-described embodiment may be embodied by mutually combining them as appropriately as possible. Various phases are included in the above-described embodiment and it is possible to extract various inventions by appropriately combining a plurality of constituent elements which is disclosed with one another. For example, even in a case where some constituent elements are deleted from all the constituent elements which are indicated in the embodiment, a configuration from which these constituent elements are deleted would be extracted as the invention on condition that the advantageous effect is obtained.

What is claimed is:

1. An electronic musical instrument comprising:
- a plurality of keys that includes at least first keys corresponding to a first pitch range and second keys corresponding to a second pitch range; and
- at least one processor, wherein the at least one processor executes:
  - acquiring an integer value indicating a numerical quantity of operated keys for each pitch range within a predetermined time frame;
  - outputting music sound in accordance with a user operation of at least one key;
  - outputting, based on the operated at least one key, automatic accompaniment sounds in addition to the music sound; and giving at least one instruction for switching an automatic accompaniment pattern of accompaniment sounds to be emitted in accordance with the acquired integer value indicating the numerical quantity of operated keys for each pitch range such that a first accompaniment pattern is set when the acquired integer value in the first pitch range is a first integer value and the acquired integer value in the second pitch range is a second integer value different from the first integer value, and a second accompaniment pattern different from the first accompaniment pattern is set when the acquired integer value in the first pitch range is the second integer value and the acquired integer value in the second pitch range is the first integer value, wherein, in accordance with the acquired integer value indicating the numerical quantity of operated keys in the first pitch range and the acquired integer value indicating the numerical quantity of operated keys in the second pitch range, the at least one processor gives the at least one instruction for switching the automatic accompaniment pattern of accompaniment sounds so as to change at least one of (i) a volume of the accompaniment sounds, (ii) a pitch range of the accompaniment sounds so as to exceed or not exceed a predetermined pitch, (iii) a sound reproduction frequency of the accompaniment sounds, (iv) a velocity value of the accompaniment sounds, or (v) a probability of occurrence of a sound included in the accompaniment sounds.

2. The electronic musical instrument according to claim 1, wherein:

the first pitch range is a lower pitch range which is lower than the second pitch range, the at least one instruction includes at least one instruction for muting a bass part of the automatic accompaniment pattern, and the at least one processor executes:

giving the at least one instruction to mute the bass part so that no bass part is audible among the accompaniment sounds of the automatic accompaniment pattern, in response to a determination that the acquired integer value indicating the numerical quantity of operated keys in each pitch range satisfies a first condition in which only the first keys corresponding to the first pitch range are operated and keys among the plurality of keys corresponding to pitch ranges other than the first pitch range are not operated.

3. The electronic musical instrument according to claim 2, wherein:

the second pitch range is a mid-low pitch range which is higher than the first pitch range, the at least one instruction includes at least one instruction to switch a pattern of the bass part in the automatic accompaniment pattern, and the at least one processor executes:

giving the at least one instruction to switch the pattern of the bass part in the automatic accompaniment pattern in response to a determination that the acquired integer value indicating the numerical quantity of operated keys in each pitch range satisfies a second condition in which only the second keys corresponding to the second pitch range are operated and keys among the plurality of keys corresponding to pitch ranges other than the second pitch range are not operated.

4. The electronic musical instrument according to claim 3, wherein the at least one processor executes:

giving the at least one instruction to switch the pattern of the bass part in the automatic accompaniment pattern, in response to a determination that the acquired integer value indicating the numerical quality of operated keys in each pitch range satisfies neither the first condition nor the second condition.

5. The electronic musical instrument according to claim 4, wherein the at least one processor executes:

determining a snare drum sound generation probability of a drum part in the automatic accompaniment pattern in accordance with the acquired integer value indicating the numerical quantity of operated keys for a mid-high pitch range, such that the snare drum sound generation probability varies depending on the acquired integer value indicating the numerical quantity of operated keys for the mid-high pitch range, whereby the snare drum sound generation probability is set to a first value when the acquired integer value indicating the numerical quantity of operated keys for the mid-high pitch range is the first integer value, the snare drum sound generation probability is set to a second value when the acquired integer value indicating the numerical quantity of operated keys for the mid-high pitch range is the second integer value, and the snare drum sound generation probability is set to a third value when the acquired integer value indicating the numerical quantity of operated keys for the mid-high pitch range is a third integer value, wherein the mid-high pitch range is one of the first pitch range and the second pitch range.

6. The electronic musical instrument according to claim 1, wherein the at least one processor executes:

determining a velocity value of a ride cymbal sound in a drum part of the automatic accompaniment pattern in accordance with the acquired integer value indicating the numerical quantity of operated keys for a high pitch range such that the velocity value varies depending on the acquired integer value indicating the numerical quantity of operated keys for the high pitch range, whereby the velocity value is set to a first value when the acquired integer value indicating the numerical quantity of operated keys for the high pitch range is a first integer value, the velocity value is set to a second value when the acquired integer value indicating the numerical quantity of operated keys for the high pitch range is a second integer value, and the velocity value is set to a third value when the acquired integer value indicating the numerical quantity of operated keys for the high pitch range is a third integer value, wherein the high pitch range is one of the first pitch range and the second pitch range.

7. A method of controlling an electronic musical instrument having a plurality of keys that includes at least first keys corresponding to a first pitch range and second keys corresponding to a second pitch range, the method comprising:

acquiring an integer value indicating a numerical quantity of operated keys for each pitch range within a predetermined time frame;

outputting music sound in accordance with a user operation of at least one key;

outputting, based on the operated at least one key, automatic accompaniment sounds in addition to the music sound; and giving at least one instruction for switching an automatic accompaniment pattern of accompaniment sounds to be emitted in accordance with the acquired integer value indicating the numerical quantity of operated keys for each pitch range such that a first accompaniment pattern is set when the acquired integer value in the first pitch range is a first integer value and the acquired integer value in the second pitch range is a second integer value different from the first integer value, and a second accompaniment pattern different from the first accompaniment pattern is set when the acquired integer value in the first pitch range is the second integer value and the acquired integer value in the second pitch range is the first integer value, wherein the method includes giving the at least one instruction for switching the automatic accompaniment pattern of accompaniment sounds in accordance with the acquired integer value indicating the numerical quantity of operated keys in the first pitch range and the acquired integer value indicating the numerical quantity of operated keys in the second pitch range so as to change at least one of (i) a volume of the accompaniment sounds, (ii) a pitch range of the accompaniment sounds so as to exceed or not exceed a predetermined pitch, (iii) a sound reproduction frequency of the accompaniment sounds, (iv) a velocity value of the accompaniment sounds, and (v) a probability of occurrence of a sound included in the accompaniment sounds.

8. The method according to claim 7, wherein:

the first pitch range is a lower pitch range which is lower than the second pitch range, the at least one instruction includes at least one instruction for muting a bass part of the automatic accompaniment pattern, and the method comprises:

giving the at least one instruction to mute the bass part so that no bass part is audible among the accompaniment sounds of the automatic accompaniment pattern, in response to a determination that the acquired integer value indicating the numerical quantity of operated keys in each pitch range satisfies a first condition in which only the first keys corresponding to the first pitch range are operated and keys among the plurality of keys corresponding to pitch ranges other than the first pitch range are not operated.

9. The method according to claim 8, wherein:

the second pitch range is a mid-low pitch range which is higher than the first pitch range, the at least one instruction includes at least one instruction to switch a pattern of the bass part in the automatic accompaniment pattern, and the method comprises:

giving the at least one instruction to switch the pattern of the bass part in the automatic accompaniment pattern in response to a determination that the acquired integer value indicating the numerical quantity of operated keys in each pitch range satisfies a second condition in which only the second keys corresponding to the second pitch range are operated and keys among the plurality of keys corresponding to pitch ranges other than the second pitch range are not operated.

10. The method according to claim 9, wherein the at method comprises:

giving the at least one instruction to switch the pattern of the bass part in the automatic accompaniment pattern, in response to a determination that the acquired integer value indicating the numerical quality of operated keys in each pitch range satisfies neither the first condition nor the second condition.

11. The method according to claim 9, wherein the method comprises:

determining a snare drum sound generation probability of a drum part in the automatic accompaniment pattern in accordance with the acquired integer value indicating the numerical quantity of operated keys for a mid-high pitch range, such that the snare drum sound generation probability varies depending on the acquired integer value indicating the numerical quantity of operated keys for the mid-high pitch range, whereby the snare drum sound generation probability is set to a first value when the acquired integer value indicating the numerical quantity of operated keys for the mid-high pitch range is the first integer value, the snare drum sound generation probability is set to a second value when the acquired integer value indicating the numerical quantity of operated keys for the mid-high pitch range is the second integer value, and the snare drum sound generation probability is set to a third value when the acquired integer value indicating the numerical quantity of operated keys for the mid-high pitch range is a third integer value, wherein the mid-high pitch range is one of the first pitch range and the second pitch range.

12. The method according to claim 7, wherein the method comprises:

determining a velocity value of a ride cymbal sound in a drum part of the automatic accompaniment pattern in accordance with the acquired integer value indicating the numerical quantity of operated keys for a high pitch range such that the velocity value varies depending on the acquired integer value indicating the numerical quantity of operated keys for the high pitch range, whereby the velocity value is set to a first value when the acquired integer value indicating the numerical quantity of operated keys for the high pitch range is a first integer value, the velocity value is set to a second value when the acquired integer value indicating the numerical quantity of operated keys for the high pitch range is a second integer value, and the velocity value is set to a third value when the acquired integer value indicating the numerical quantity of operated keys for the high pitch range is a third integer value, wherein the high pitch range is one of the first pitch range and the second pitch range.

13. A non-transitory computer-readable medium having stored thereon a program that is executable by at least one processor of an accompaniment sound automatic generation device comprising a plurality of keys that includes at least first keys corresponding to a first pitch range and second keys corresponding to a second pitch range, the program being executable by the at least one processor to control the at least one processor to perform functions comprising:

acquiring an integer value indicating a numerical quantity of operated keys for each pitch range within a predetermined time frame;

outputting music sound in accordance with a user operation of at least one key;

outputting, based on the operated at least one key, automatic accompaniment sounds in addition to the music sound; and giving at least one instruction for switching an automatic accompaniment pattern of accompaniment sounds to be emitted in accordance with the acquired integer value indicating the numerical quantity of operated keys for each pitch range such that a first accompaniment pattern is set when the acquired integer value in the first pitch range is a first integer value and the acquired integer value in the second pitch range is a second integer value different from the first integer value, and a second accompaniment pattern different from the first accompaniment pattern is set when the acquired integer value in the first pitch range is the second integer value and the acquired integer value in the second pitch range is the first integer value, wherein the program is executable by the at least one processor to control the at least one processor to give the at least one instruction for switching the automatic accompaniment pattern of accompaniment sounds in accordance with the acquired integer value indicating the numerical quantity of operated keys in the first pitch range and the acquired integer value indicating the numerical quantity of operated keys in the second pitch range, so as to change at least one of (i) a volume of the accompaniment sounds, (ii) a pitch range of the accompaniment sounds so as to exceed or not exceed a predetermined pitch, (iii) a sound reproduction frequency of the accompaniment sounds, (iv) a velocity value of the accompaniment sounds, and (v) a probability of occurrence of a sound included in the accompaniment sounds.

14. The non-transitory computer-readable medium according to claim 13, wherein the at least one instruction includes at least one instruction for muting a bass part of the automatic accompaniment pattern and at least one instruction for switching a pattern of the bass part.

15. The electronic musical instrument according to claim 1, wherein the at least one processor executes:

calculating a sound generation probability by using a formula in which the acquired integer value indicating the numerical quantity of operated keys in a specific pitch range among the first pitch range and the second pitch range in the predetermined time frame is input as a variable, such that the sound generation probability varies depending on the acquired integer value indicating the numerical quantity of operated keys for the specific pitch range, whereby the sound generation probability is set to a first value when the acquired numerical quantity of operated keys for the specific pitch range is the first integer value, and the sound generation probability is set to a second value when the acquired numerical quantity of operated keys for the specific pitch range is the second integer value.

16. The method according to claim 7, further comprising:

calculating a sound generation probability by using a formula in which the acquired integer value indicating the numerical quantity of operated keys in a specific pitch range among the first pitch range and the second pitch range in the predetermined time frame is input as a variable, such that the sound generation probability varies depending on the acquired integer value indicating the numerical quantity of operated keys for the specific pitch range, whereby the sound generation probability is set to a first value when the acquired numerical quantity of operated keys for the specific pitch range is the first integer value, and the sound generation probability is set to a second value when the acquired numerical quantity of operated keys for the specific pitch range is the second integer value.

17. The non-transitory computer-readable medium according to claim 13, wherein the program is executable by the at least one processor to control the at least one processor to calculate a sound generation probability by using a formula in which the acquired integer value indicating the numerical quantity of operated keys in a specific pitch range among the first pitch range and the second pitch range in the predetermined time frame is input as a variable, such that the sound generation probability varies depending on the acquired integer value indicating the numerical quantity of operated keys for the specific pitch range, whereby the sound generation probability is set to a first value when the acquired numerical quantity of operated keys for the specific pitch range is the first integer value, and the sound generation probability is set to a second value when the acquired numerical quantity of operated keys for the specific pitch range is the second integer value.

18. The electronic musical instrument according to claim 1, wherein:

the at least one instruction includes at least one instruction for muting a part that corresponds to the first pitch range included in the automatic accompaniment pattern, and the at least one processor executes:

giving the at least one instruction to mute the part corresponding to the first pitch range included in the automatic accompaniment pattern in response to a determination based on the acquired integer value indicating the numerical quantity of operated keys in each pitch range that only the first keys corresponding to the first pitch range have been operated and the second keys corresponding to the second pitch range other than the first pitch range have not been operated.

19. The method according to claim 7, wherein:

the at least one instruction includes at least one instruction for muting a part that corresponds to the first pitch range included in the automatic accompaniment pattern, and the method comprises:

giving the at least one instruction to mute the part corresponding to the first pitch range included in the automatic accompaniment pattern in response to a determination based on the acquired integer value indicating the numerical quantity of operated keys in each pitch range that only the first keys corresponding to the first pitch range have been operated and the second keys corresponding to the second pitch range other than the first pitch range have not been operated.

20. The non-transitory computer-readable medium according to claim 13, wherein:

the at least one instruction includes at least one instruction for muting a part that corresponds to the first pitch range included in the automatic accompaniment pattern, and the program is executable by the at least one processor to control the at least one processor to:

give the at least one instruction to mute the part corresponding to the first pitch range included in the automatic accompaniment pattern in response to a determination based on the acquired integer value indicating the numerical quantity of operated keys in each pitch range that only the first keys corresponding to the first pitch range have been operated and the second keys corresponding to the second pitch range other than the first pitch range have not been operated.

* * * * *